United States Patent [19]

Bucaro

[11] 4,297,887
[45] Nov. 3, 1981

[54] HIGH-SENSITIVITY, LOW-NOISE, REMOTE OPTICAL FIBER

[75] Inventor: Joseph A. Bucaro, Herndon, Va.

[73] Assignee: The United States of America as represented by the Secretary of the Navy, Washington, D.C.

[21] Appl. No.: 122,648

[22] Filed: Feb. 19, 1980

[51] Int. Cl.³ .............................................. G02B 5/14
[52] U.S. Cl. .................................................... 73/655
[58] Field of Search ............ 73/655; 350/96.13, 96.29; 455/605, 612, 614

[56] References Cited

U.S. PATENT DOCUMENTS

| | | | |
|---|---|---|---|
| 4,162,397 | 7/1979 | Bucaro et al. | 73/655 |
| 4,235,113 | 11/1980 | Carome | 73/655 |
| 4,238,856 | 12/1980 | Bucaro et al. | 73/655 |

OTHER PUBLICATIONS

J. A. Bucaro et al., "Fiber-Optic Hydrophone", J. Acoust. Soc. Am., vol. 62 No. 5, pp. 1302-1304, Nov. 1977.

Primary Examiner—Stephen A. Kreitman
Attorney, Agent, or Firm—R. S. Sciascia; William T. Ellis; Melvin L. Crane

[57] ABSTRACT

An optical system which detects acoustical signals in a fluid medium such as seawater. The acoustical sensor assembly includes an acoustical sensor which is formed by two optical fibers which have different sensitivities to acoustical signals and are connected with the optical radiation conductor or conductors by use of an optical coupler which couples optical radiation into each of the optical fibers of the acoustical sensor. Since the optical fibers of the acoustical sensor have different acoustical sensitivities to acoustical signals, the phase of the optical radiation transmitted through each optical fiber of the acoustical sensor will change differently due to acoustical signals incident thereon. The optical radiation from the optical fibers of the acoustical sensor is directed back through an optical fiber to a photodetector. The photodetector produces a modulated output signal in accordance with the acoustical energy detected.

9 Claims, 3 Drawing Figures

HIGH-SENSITIVITY, LOW-NOISE, REMOTE OPTICAL FIBER

BACKGROUND OF THE INVENTION

The invention relates to acoustic wave detectors and more particularly to the use of a compact optical-fiber sensor assembly for the detection of sound waves in a fluid medium.

Heretofore sound waves have been detected by different types of electromechanical devices such as capacitance microphones and piezoelectric and magnetostrictive transducers. These yield an electrical output signal when exposed to incident sound waves. Such devices provide a means for directly obtaining an electrical signal that varies in time in the same way that the pressure varies in the sound field. Some of the disadvantages of such systems are that they are bulky, expensive and require impedance matching between the sound detector and transmission and signal processing system.

Optical waveguides and optical fibers have been used for conducting optical radiation from one point to another. Uses of such systems have been contemplated in the communication field for communicating optical signals and messages from one place to another. Other systems make use of stress applied to an optical fiber to modulate the optical radiation as it is transmitted through the fiber (for instance, see U.S. Pat. No. 4,068,191).

One system, which makes use of an optical fiber coil through which optical radiation is transmitted, is disclosed in U.S. Pat. No. 2,972,051. This patent is for the detection of ionizing radiation which permanently changes the optical index of the optical fiber. Further, use of such a system has been set forth by George H. Segal et.al. in an article "New Real Time Dosimeters Use Fiber Optics" in Naval Research Laboratory and Development Highlights, Vol. 1, pp. 7 and 8, December 1974.

Optical fibers, one in the water and one not in the water, in the form of a double-path optical interferometer have been used for detecting acoustic waves in a sound medium as set forth in U.S. Pat. No. 4,162,397. This patent teaches the use of a single optical fiber in the sound-field medium where the acoustical waves interact with the single optical fiber. The detector is affixed by temperature changes which is detected as noise.

SUMMARY OF THE INVENTION

The invention comprises an optical system for detecting the presence of acoustic signals, especially in a liquid medium such as seawater. The heart of the system is a compact sensor assembly comprising a pair of optical fibers, at least one of which is wound into a coil and at least one of which has the characteristic of acoustical sensitivity, i.e., the velocity of light waves passing thru the fiber is changed by the pressure of acoustic signals which impinge on the fiber. Various configurations of the two optical fibers, such as the fibers being paralleled and wound into equal-length coils, may be used, the common characteristic of the different configurations being that a differential phase change in light traversing both fibers will be induced by exposure of the sensor assembly to acoustic signals. The system includes a lead-line means for conducting light to and from a light-splitting and combining means, the light from the lead-line means being split into a pair of beams each of which is fed to a different fiber in said sensor assembly. The pair of beams after passage thru the fibers is then recombined by the light splitting and combining means to the lead-line means and thence to detection means which produces a signal proportional to any phase change which has occurred in the sensor assembly.

DETAILED DESCRIPTION

The invention is based upon the knowledge that light passing through an optical fiber is affected by a change in the physical structure or optical characteristics of the fiber, such as change in the index of refraction, diameter of the fiber or length of the fiber. These changes cause a change in velocity, and thus a phase shift, in the light traversing the optical fiber, which phase shift is dependent upon the product of pressure exerted on the optical fiber and the interaction length. The sensors of this invention are formed into optical coils; therefore each turn of the coil will be subjected to pressure exerted upon the coil by an incident acoustic wave. Since each turn of the coils is subjected to the pressure of the incident acoustic wave, the index of refraction, length, and diameter of each turn of the coil will be changed. Since the phase shift is dependent upon the product of the pressure applied to the fiber and the interaction length is the total length of all turns affected, there will be sufficient change to provide a measurable phase shift in the optical radiation passing through the sensor coils.

Figure 1:
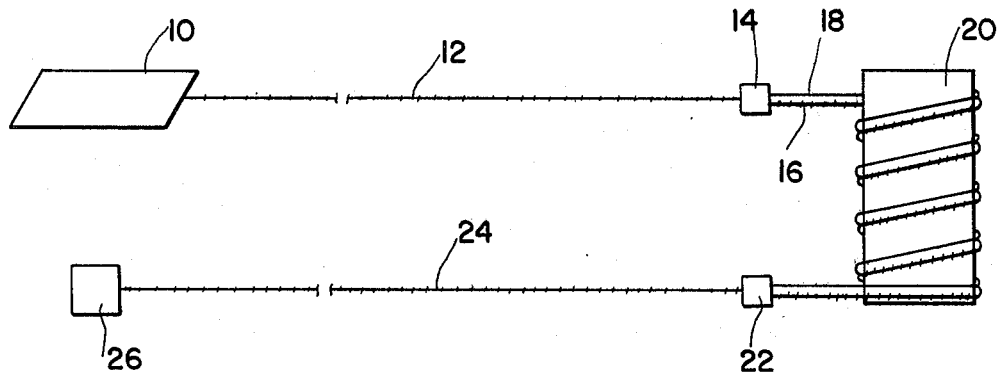
FIG. 1 illustrates an acoustic-signal-detecting system made in accordance with this invention.

FIG. 1 illustrates an optical fiber, acoustical-signal-detecting system including a laser means 10 for producing coherent light that is coupled into an optical fiber 12 of a desired type, such as one having a plastic coating surrounding the optical fiber. The laser light is directed from laser 10 through the optical fiber 12 called a lead line, to a coupler-Bragg shifter 14. The coupler-Bragg shifter divides the laser light into two separate beams which are coupled into two separate side-by-side fibers 16 and 18. The optical fibers 16 and 18 are wrapped around a supporting structure 20 to form an acoustical-signal sensor assembly.

Fiber 18 has the same optical properties for light passing through the optical fiber as that of fiber 16 but has a different sensitivity to acoustical signals. Fiber 18 is made with a different fiber covering from that of fiber 16 which causes it to have a different sensitivity to incident acoustical signals. For example, fiber 18 could be bare, or having a coating of different thickness or have a coating made from a different material which invests it with a different acoustical sensitivity.

The two fibers 16 and 18 are coupled at their output ends to a coupler 22 which combines the outputs into a resultant modulated signal and couples into a single optical-fiber lead line 24 which may have the same or different optical properties as optical fiber 12. The optical fiber 24 conducts the resultant optical signal from the acoustical sensor to a photodetector 26 where a modulated signal appears in the photocurrent output due to the presence of the acoustical signal. The photocurrent corresponds to the acoustical signal. The signal processor may be calibrated to have a null reading due to the optical signal only, that is, without an acoustical signal present on the optical fiber sensor. The presence of an acoustic signal changes the optical characteristics of the optical sensor fibers differently so that the effect, such as phase change, on the optical signal passing through each of the optical fibers is different. This different effect changes the phase of the light passing through the optical sensor fibers differently, the phase change difference being detected to measure the acoustic signal. The portion of the optical fibers between the optical shifter 14 and coupler 22, including that surrounding the supporting structure, is identified as the acoustical sensor length and the fibers between the laser, and/or photodetector, and the signal detector assembly may be identified as the optical-fiber lead lengths or lead lines.

It is obvious that an acoustic signal traveling in a fluid medium does not produce much of an optical phase shift in a single straight optical fiber in the fluid medium. Therefore it is important and necessary in order to produce a detectable change in the optical radiation, due to a change in the characteristics of an optical fiber resulting from incidence of an acoustic signal, to increase the length of the sensing fiber or fibers, as by a coil configuration. Thus, an acoustic signal incident on the optical fiber coil will affect every turn of the coil as the acoustic wave passes the coil. The acoustic waves exert a pressure on each turn of the optical fiber coil thereby causing variations in the index of refraction, diameter, and length of the optical fiber. Even though the change in one turn is minor, the total change in a number of turns in the coil is sufficient to introduce measurable optical phase shifts, doppler frequency shifts, mode conversion and other changes in the propagation characteristics of the optical beam traveling through the fiber.

In operation of the device shown by FIG. 1, laser radiation is coupled from laser 10 into the optical fiber conductor 12 which conducts the laser light to the coupler-Bragg shifter 14. The coupler-Bragg shifter couples the radiation into the input end of each of the optical fibers 16 and 18 which form the acoustic-sensor lengths and which conduct the laser radiation around the fiber-supporting structure 20. Acoustical radiation incident on optical fibers 16 and 18 will induce the same pressure on each of the optical fibers. Since optical fiber 16 has a covering thereon which differs from optical fiber 18, the sensitivity to the acoustical signal will be different in each optical fiber.

Figure 2:
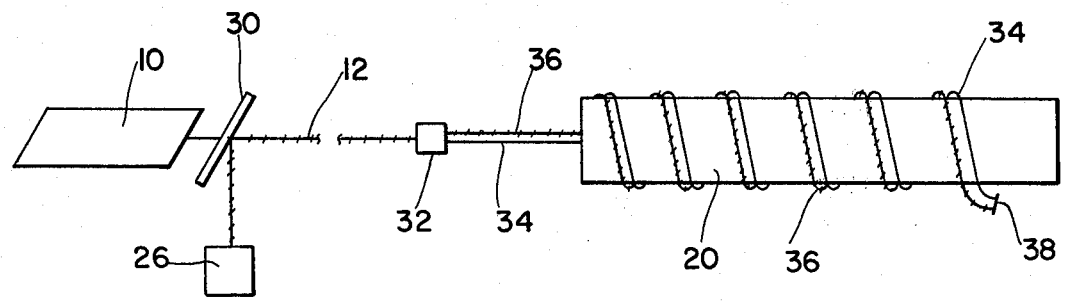
FIGS. 2 and 3 show modifications of the system of FIG. 1.

FIG. 2 differs over that of FIG. 1 by using an optical reflector 30 which passes optical radiation incident on one side thereof while reflecting returned optical radiation incident on the opposite side. The optical reflector passes optical radiation from a laser device which is coupled into an optical fiber 12. The optical fiber 12 conducts the laser radiation to a light-splitting and combining means 32, which may comprise a bidirectional coupler-Bragg shifter 32. The coupler-Bragg shifter couples the laser light into two optical fibers 34 and 36 which are formed into coils the same as or similar to optical fibers 16 and 18, respectively. Optical fibers 34 and 36 are each provided with a mirror or reflector 38 at the end away from the coupler 31, which reflector reflects any incident light back through the respective optical fibers. The light reflected back through the optical fibers is coupled by the bidirectional coupler 32 into the optical fiber 12. The light which passes back through the optical fiber 12 is reflected by the reflector 30 to the photodetector 26.

The output of the photodetector is processed as set forth above to indicate the presence of an acoustical signal.

The operation of the system shown in FIG. 2 for detecting an acoustical signal is substantially the same as that of FIG. 1, with the exception that only one optical fiber is used between the reflector 30 and the coupler-Bragg shifter 32. Also, the optical fibers which respond to the acoustical signal have mirrors on their ends. The acoustic signal detection results from phase changes in the optical fibers 34 and 36 similar to that in optical fibers 16 and 18 of FIG. 1. The light passes through the fibers twice due to the use of the mirrors or reflectors on the ends of the optical fibers. The acoustical signal sensor in this modification includes the optical fibers 34 and 36 beginning at the coupler 32. Only one of the coil fibers may have acoustical sensitivity; the other may be acoustically insensitive. It is apparent that this combination will also provide a differential change between the phases of the light beams traversing the fibers (since, off the phase of only one beam is changed, there still will be a differential phase change between the two beams.)

The modification shown in FIG. 2 may be made with one optical fiber of the sensor of lesser length and number of turns than the other as explained above for the sensor of FIG. 1. The acoustical wave measurement is performed in the same manner.

Figure 3:
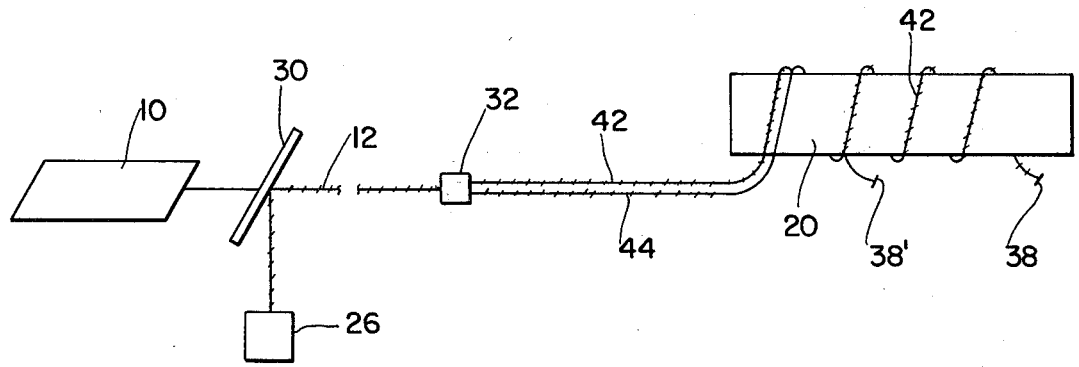

The modification shown by FIG. 3 assembles two optical fibers 42 and 44 on the optical-fiber-supporting structure 20, which functions as the main acoustic signal sensor. The optical fiber 44 parallels optical fiber 42 in the detection medium between the coupler-Bragg shifter 32 and the supporting structure and its coil is made with many fewer turns, if any, on the supporting structure than that of optical fiber 42. Each of the fiber ends are provided with mirrors or reflectors 38 and 38' which reflect the optical radiation back through the respective optical fibers. Since one optical fiber of the sensor has many fewer turns on the supporting structure than the other, the phase shifts of the two fibers relative to the incident acoustical energy will be different. An acoustical signal incident on the sensor causes a greater change in phase in the optical radiation traversing the optical fiber having the greater length due to its turns around the supporting structure; therefore, the sensor output will exhibit a differential phase change due to the presence of the acoustic signal. The acoustical sensor in the modification includes the optical fibers 42 and 44 beginning at the coupler 32.

Each of the modifications shown herein enables one to detect acoustical signals because the optical fibers of the acoustical sensor provide a differential phase change between the light beams traversing the fibers in the area of detection, i.e., around the compact supporting structure. The sensor of FIG. 1 can be formed by two optical fiber coils with the same optical properties and the same acoustical sensitivity. However, in this case, one optical fiber coil must be considerably longer in length than the other optical fiber. In this modification, the phase change in the longer optical fiber coil will be greater than the phase change in the shorter optical fiber coil due to the greater number of turns subjected to the incident acoustical wave.

The sensor sensitivity is dependent upon the number of turns of the optical fibers whereas the difference in fiber sensitivity to the incident acoustical waves depends on the difference in the thickness of the cladding or other coating. One of the optical fibers of the sensor may be uncoated.

In the devices shown in FIGS. 1 and 2 the number of turns for each optical fiber coiled around the supporting structure may be less in number for one optical fiber than that of the other. The greater the number of the turns that there are around the support, the greater the number of times an incident acoustical wave will "cut" the optical fibers. Therefore, the sensor sensitivity to the incident acoustic wave can be increased by increasing the number of turns of the optical fibers about the support. The greater the number of times the acoustic-wave "cuts" the optical fibers, the greater will be the phase change in the radiation traversing the optical fiber. The greater the phase change, the stronger the output signal from the photodetector will be.

The detector-processor means, laser means and operating accessories may be aboard a ship, on shore, or on some stationary platform. The optical fiber lead lines may be as long as permitted operationally with the acoustical sensor means at the end of the lead lines. In this arrangement, noise problems are entirely eliminated since only optical phase changes generated in the sensor length are detected. Any noise generated in the lead lines are not detected because there is no differential phase change in the optical radiation during its passage through the lead lines. Optical sources with coherence lengths no greater than about an optical wavelength can be used. This permits the use of light emitting diodes, lasers, and even white light sources in the sensors of FIGS. 1 and 2.

For pressures as great as 100 atmospheres, a coherence length of only about 1 cm is required for sensors using as much as 100 meters of fiber in the sensing region. For this case, multimode, rather than single mode, lasers can be utilized.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An acoustic signal sensing device comprising in combination:
    acoustic signal sensor means, comprising a pair of optical fibers, at least one of which has acoustical sensitivity, for sensing acoustic signals by their action on the fiber to vary light beam velocity in the fiber and thus produce, in response to an impinging acoustical signal, a differential phase change between light beams simultaneously traversing said optical fibers;
    optical-fiber lead-line means for conducting light beams to and from said sensor means;
    light-splitting and combining means connected between said sensor means and said lead-line means for splitting an input light beam coming from said lead-line means into two components and feeding each component to a different one of said sensor optical fibers, and for combining the output beams from said optical fibers into a single resultant light beam and feeding it back to said lead-line means; and
    detector means for deriving the resultant light beam from said lead-line means and producing an output signal proportional to said differential phase change between the outputs of said optical fibers in said sensor means;
    at least one of said optical fibers is formed into a coil;
    both said optical fibers have different acoustic sensitivities, are equal in length and are formed into coils each having two ends, an input end connected to said light-splitting and combining means, and a second end,
    said lead-line means comprises a single optical fiber,
    said sensor device further including mirror means to which said second ends of said optical fibers are connected for reflecting light beams in said fibers back to their input ends.

2. An acoustic signal sensing device comprising, in combination:
    acoustic signal sensor means, comprising a pair of optical fibers, at least one of which has acoustical sensitivity, for sensing acoustic signals by their action on the fiber to vary light beam velocity in the fiber and thus produce, in response to an impinging acoustical signal, a differential phase change between light beams simultaneously traversing said optical fibers;
    optical fiber lead line means for conducting light beams to and from said sensor means;
    light-splitting and combining means connected between said sensor means and said lead line means for splitting an input light beam coming from said lead line means into two components and feeding each component to a different one of said sensor optical fibers, and for combining the output beams from said optical fibers into a single resultant light beam and feeding it back to said lead line means; and
    detector means for deriving the resultant light beam from said lead line means and producing an output signal proportional to said differential phase change between the outputs of said optical fibers in said sensor means;
    at least one of said optical fibers is formed into a coil;
    said pair of optical fibers are unequal in length, each fiber having an input end and a second end,
    and wherein said lead line means comprises a single optical fiber connected between said light splitting and combining means and said detector means,
    said sensing means further including:
    a pair of mirrors, a different one coupled to each optical fiber at its second end for reflecting light beams back to its input end.

3. A sensing device as in claim 2, wherein at least the longer of the two optical fibers in said sensor means has acoustic sensitivity.

4. A sensing device as in claim 3, wherein the longer of the two optical fibers in said sensor means is formed into a coil.

5. An acoustic-signal detector comprising:
    means for sensing acoustic signals in a fluid medium, comprising a pair of optical fibers,
    said optical fibers being physically arranged so that said pair of optical fibers may be exposed to an acoustic signal existing in said fluid medium;
    means for introducing a separate optical signal into an input end of each one of said pair of optical fibers, the difference in phase between the two optical signals being constant;
    means for indicating a phase change of said separate optical signals in said pair of optical fibers due to incidence of an acoustic signal on said pair of optical fibers in said fluid medium;

said separate optical signals introduced into said pair of optical fibers have the same phase;

one optical fiber lead line for conducting light to and from said sensor means, and an optical reflector means in said one lead line for reflecting light returned from said sensor means to said means for indicating a total phase change in said separate optical signals.

6. A detector as claimed in claim 5 in which:

each of said parallel optical fibers is said sensor means has an input end that receives light from said lead-lines with a deflector on the oposite end of each sensor optical fiber which reflects light back through said sensor optical fibers to said coupler and said lead-line.

7. A detector a claimed to claim 6 in which:

one of said sensor optical fibers is longer than the other with the longer optical fiber functioning mainly as the acoustical signal sensor.

8. A detector as claimed in claim 7 in which:

said longer portion of said optical fiber is formed into a coil having many turns about a support means.

9. A detector as claimed in claim 7 in which:

said optical fibers forming said sensor is in the form of a coil about a support means.

* * * * *